(12) United States Patent
Adonakis (10) Patent No.: US 7,954,792 B2
(45) Date of Patent: Jun. 7, 2011

(54) STRUT ASSEMBLY WITH AIR SPRING

(75) Inventor: Nikolaos Adonis Adonakis, West Bloomfield, MI (US)

(73) Assignee: Axletech International IP Holdings, LLC., Troy, MI (US)

( * ) Notice: Subject to any disclaimer, the term of this patent is extended or adjusted under 35 U.S.C. 154(b) by 25 days.

(21) Appl. No.: 12/362,587

(22) Filed: Jan. 30, 2009

(65) Prior Publication Data

US 2009/0212472 A1   Aug. 27, 2009

Related U.S. Application Data

(60) Provisional application No. 61/030,628, filed on Feb. 22, 2008, provisional application No. 61/060,347, filed on Jun. 10, 2008.

(51) Int. Cl.
*F16D 57/00* (2006.01)

(52) U.S. Cl. ............... 267/64.27; 267/221; 267/226

(58) Field of Classification Search ............... 267/34, 267/35, 64.15, 64.21, 221, 64.27, 226; 188/298
See application file for complete search history.

(56) References Cited

U.S. PATENT DOCUMENTS

| | | |
|---|---|---|
| 2,896,551 A | 7/1959 | Lich |
| 2,918,273 A | 12/1959 | Whisler et al. |
| 3,000,625 A | 9/1961 | Polhemus |
| 3,599,954 A | 8/1971 | Yew |
| 3,601,063 A | 8/1971 | Dean |
| 4,211,429 A * | 7/1980 | Howard ............... 280/124.162 |
| 4,257,499 A * | 3/1981 | Deschner ............... 188/287 |
| 4,415,146 A | 11/1983 | Sitko |
| 4,473,216 A | 9/1984 | Paton et al. |
| 4,475,722 A | 10/1984 | Paton et al. |
| 4,534,580 A | 8/1985 | Kobayashi et al. |
| 4,555,096 A * | 11/1985 | Pryor ............... 267/64.21 |
| 4,667,941 A * | 5/1987 | Hayashi et al. ........... 267/64.16 |
| 4,817,928 A * | 4/1989 | Paton ............... 267/219 |
| 5,197,718 A | 3/1993 | Wallis |
| 5,248,131 A | 9/1993 | Jobelius |
| 5,678,808 A * | 10/1997 | Claude et al. ............ 267/64.15 |
| 6,227,527 B1 * | 5/2001 | Berg ............... 267/218 |
| 6,374,966 B1 | 4/2002 | Lillbacka |
| 6,443,436 B1 * | 9/2002 | Schel ............... 267/64.21 |
| 6,843,352 B2 | 1/2005 | Jacoby et al. |
| 6,893,033 B2 | 5/2005 | Dean et al. |
| 7,322,567 B2 | 1/2008 | Lloyd |
| 7,654,370 B2 * | 2/2010 | Cubalchini, Jr. ............ 188/267 |
| 2004/0168870 A1 * | 9/2004 | Handke et al. ........... 188/321.11 |
| 2004/0232606 A1 | 11/2004 | Timoney et al. |
| 2007/0145653 A1 | 6/2007 | Toczycki et al. |

* cited by examiner

*Primary Examiner* — Christopher P Schwartz
(74) *Attorney, Agent, or Firm* — Howard & Howard Attorneys PLLC (57) ABSTRACT

A strut assembly includes a damper having a housing and a rod moveable relative to the housing along a longitudinal axis. The strut assembly includes a flexible membrane configured to receive a pressurized gas to form an air spring. A coil spring defines an inner diameter with the housing disposed within the inner diameter to permit relative movement between the coil spring and the housing. The coil spring is at least partially disposed outside the flexible membrane relative to the longitudinal axis.

34 Claims, 5 Drawing Sheets

STRUT ASSEMBLY WITH AIR SPRING

CROSS REFERENCE TO RELATED APPLICATION

This application claims the benefit of Provisional Patent Application Ser. No. 61/030,628, filed on Feb. 22, 2008, and Provisional Patent Application Ser. No. 61/060,347, filed on Jun. 10, 2008, the disclosures of each of which are hereby incorporated by reference.

BACKGROUND OF THE INVENTION

1. Field of the Invention

The subject invention generally relates to a strut assembly for a vehicle.

2. Description of the Prior Art

U.S. Pat. No. 6,374,966 to Lillbacka discloses a strut assembly for a vehicle. The strut assembly comprises a hydraulic damper, i.e., a shock absorber. The hydraulic damper includes a housing including a first housing end and a second housing end. The housing defines a fluid cavity. The housing extends along a longitudinal axis. The hydraulic damper further includes a rod moveable relative to the housing along the longitudinal axis. The rod includes a first rod end disposed within the cavity and a second rod end spaced from the housing along the longitudinal axis. A mounting plate is coupled to the second rod end. The second housing end is disposed along the longitudinal axis nearer the mounting plate than the first housing end The mounting plate is configured for attachment to the vehicle. A mounting bracket is attached to the first housing end, and is also configured for attachment to the vehicle. A flexible membrane includes a first membrane end coupled to the housing and a second membrane end coupled to the mounting plate. The flexible membrane is configured to receive a pressurized gas to form an air spring. The Air spring biases the mounting plate away from the housing along the longitudinal axis. A coil spring is entirely disposed within the flexible membrane, and includes a first spring end and a second spring end. The first spring end is in engagement with the second housing end. The second spring end is in engagement with the mounting plate. The coil spring biases the mounting plate away from the housing along the longitudinal axis.

The coil spring of the strut assembly disclosed in U.S. Pat. No. 6,374,966 assists in preventing the rod from collapsing into the housing. However, the coil spring is insufficient to carry the load of a heavy-duty vehicle should the strut assembly lose air pressure to the air spring or should the hydraulic damper fail.

SUMMARY OF THE INVENTION AND ADVANTAGES

The subject invention provides a strut assembly for a vehicle. The strut assembly comprises a damper. The damper includes a housing defining a fluid cavity. The housing extends along a longitudinal axis. The damper further includes a rod moveable relative to the housing along the longitudinal axis. The rod includes a first rod end disposed within the cavity and a second rod end spaced from the housing along the longitudinal axis. A mounting plate is coupled to the second rod end and configured for attachment to the vehicle. A flexible membrane includes a first membrane end coupled to the housing and a second membrane end coupled to the mounting plate. The flexible membrane is configured for receiving a pressurized gas to form an air spring. The air spring biases the mounting plate away from the housing along the longitudinal axis. A coil spring includes a first spring end in engagement with the housing and a second spring end in engagement with the mounting plate. The coil spring biases the mounting plate away from the housing along the longitudinal axis. The coil spring defines an inner diameter and is disposed about an outer periphery of the housing to permit axial movement of the housing within the inner diameter of the coil spring relative to the coil spring.

Accordingly, the subject invention provides a strut assembly including an air spring. The inner diameter of the coil spring is larger than the outer diameter of the housing so that the housing is disposed within the inner diameter of the coil spring. Having the housing disposed within the inner diameter of the coil spring permits the coil spring to be sized appropriately to accommodate the heavy loads associated with heavy-duty vehicles. The strut assembly of the subject invention permits the coil spring to be sized large enough to carry the entire load applied to the strut assembly in the event that the air spring and the damper malfunction.

BRIEF DESCRIPTION OF THE DRAWINGS

Other advantages of the present invention will be readily appreciated, as the same becomes better understood by reference to the following detailed description when considered in connection with the accompanying drawings.

DETAILED DESCRIPTION OF THE INVENTION

Referring to the Figures, wherein like numerals indicate corresponding parts throughout the several views, a strut assembly is shown generally at 20. The strut assembly 20 is for a vehicle, and more specifically, the strut assembly 20 is part of a suspension system of the vehicle. The strut assembly 20 absorbs shocks and dampens movement of the suspension system relative to a cabin of the vehicle to provide a cushioned ride as is well known.

Figure 1:
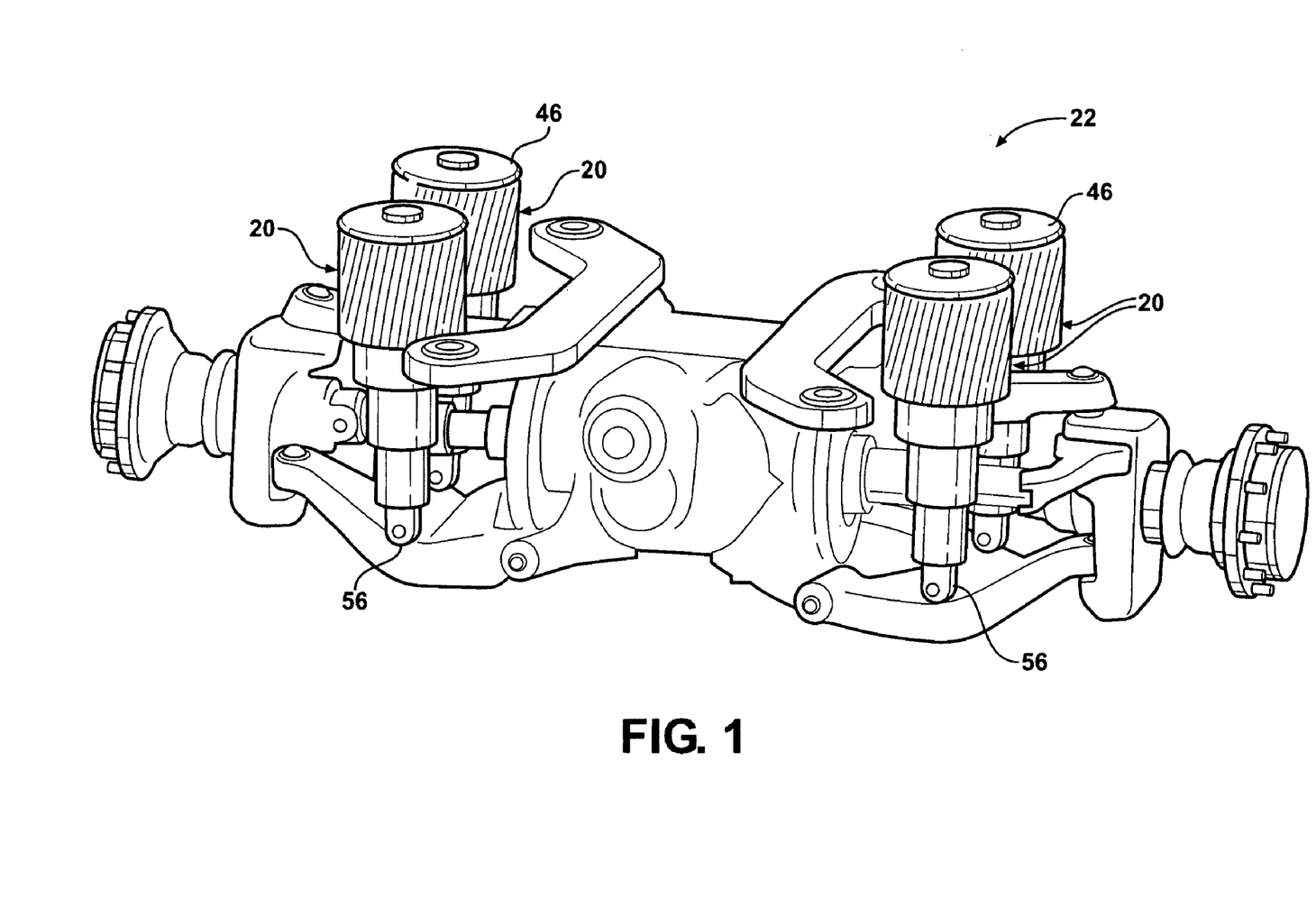
FIG. 1 is a perspective view of an axle assembly for a vehicle including a plurality of strut assemblies according to the subject invention.
Figure 2:
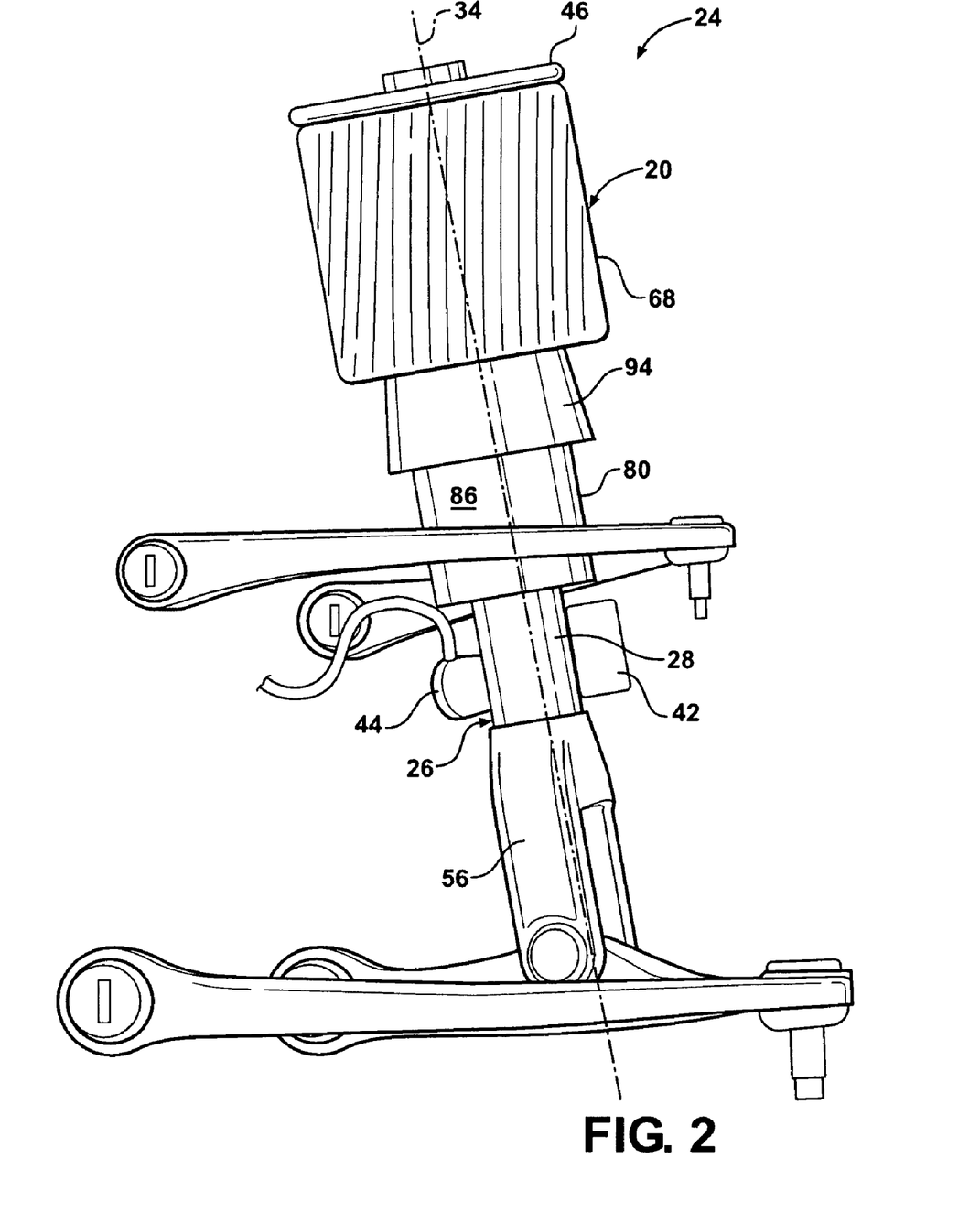
FIG. 2 is a perspective view of the strut assembly mounted to an upper and lower control arm of a vehicle.

Referring to FIGS. 1 and 2, the strut assembly 20 may be incorporated into several different types of suspension systems 22, 24. As shown in FIG. 1, the strut assembly 20 is shown in a solid axle suspension system 22. As shown in FIG. 2, the strut assembly 20 is shown as part of an independent suspension system 24. It should be appreciated that the strut assembly 20 may be utilized in combination with other types of suspensions not shown or described herein. It should also be appreciated that the specific configuration of the strut assembly 20, and the manner of attaching the strut assembly 20 to each type of suspension, may vary with differing design considerations and restraints of each vehicle and each type of suspension. The strut assembly 20 of the subject invention is especially well suited for heavy duty on-highway and/or off-highway vehicles, such as heavy duty military vehicles. While typically only one strut assembly 20 is disposed adjacent each wheel of the vehicle, it should be appreciated that multiple strut assemblies 20 may be disposed adjacent each wheel.

Figure 3:
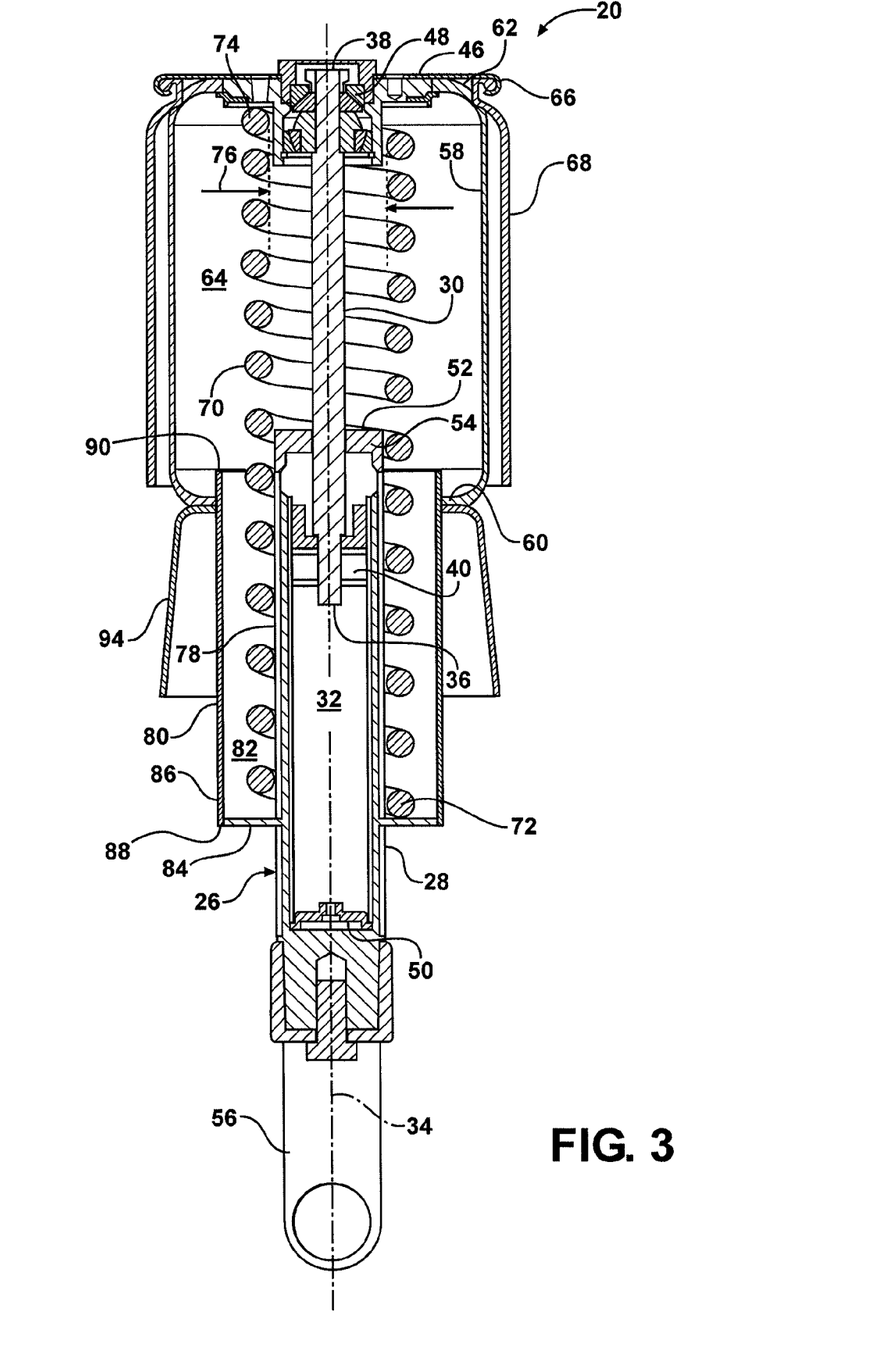
FIG. 3 is a cross sectional view of the strut assembly in an extended position.
Figure 4:
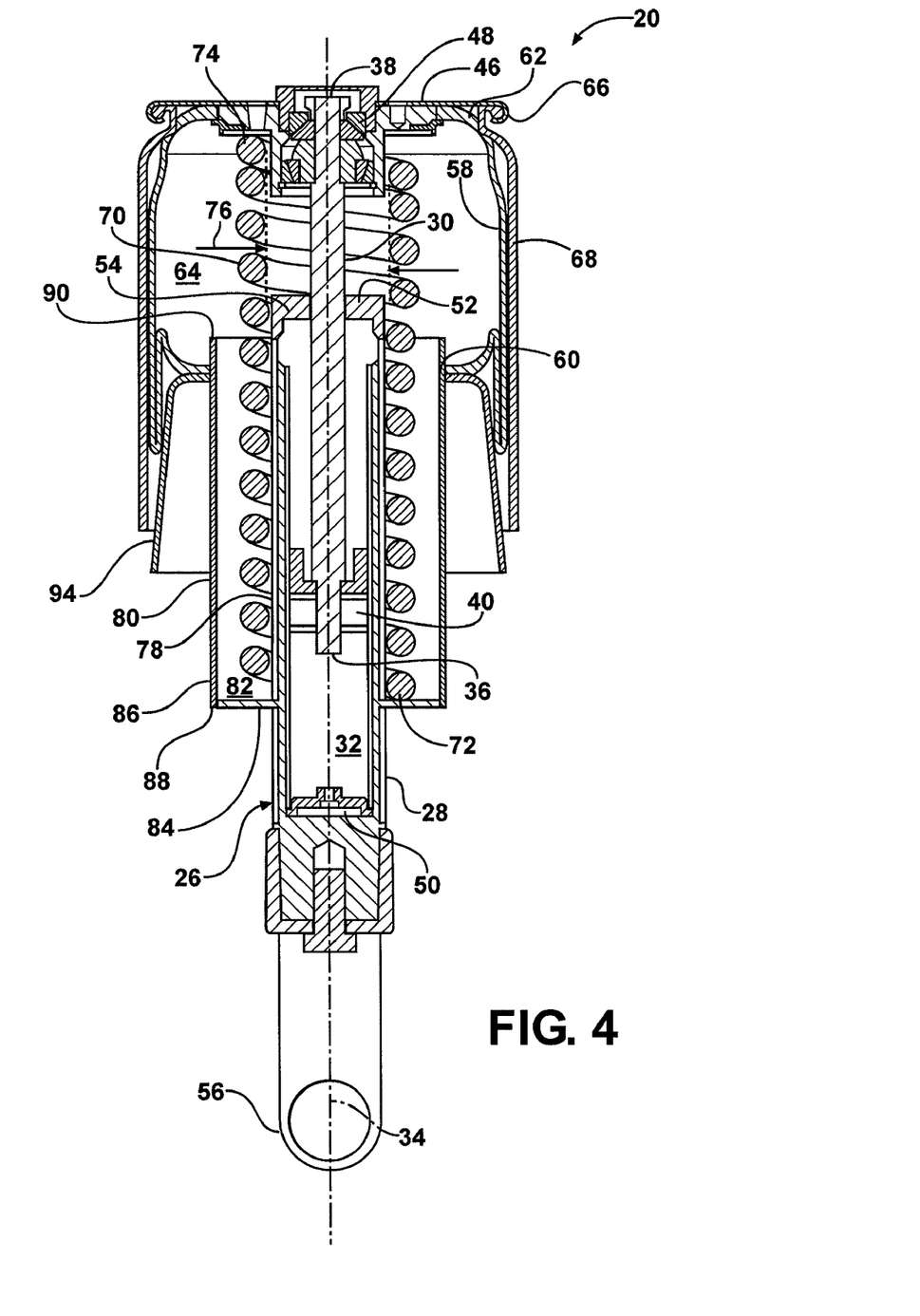
FIG. 4 is a cross sectional view of the strut assembly in a compressed position.

Referring to FIGS. 3 and 4, the strut assembly 20 includes a damper 26. The damper 26 includes a housing 28 and a rod 30. The housing 28 defines a fluid cavity 32 and extends along a longitudinal axis 34. The rod 30 is moveable relative to the housing 28 along the longitudinal axis 34 between a fully extended position shown in FIG. 3 and a fully compressed position shown in FIG. 4. The rod 30 includes a first rod end 36 disposed within the cavity and a second rod end 38 spaced from the housing 28 along the longitudinal axis 34. A damper piston 40 is attached to the first rod end 36. The damper piston 40 is moveable relative to the housing 28 during the longitudinal movement of the housing 28 relative to the rod 30.

The damper 26 may include a hydraulic damper 26. Alternatively, the damper 26 may include an air damper 26. The damper 26 operates, as is well known in the art, by forcing a fluid, such as a hydraulic fluid or air, through small orifices in the damper piston 40 as the housing 28 moves relative to the damper piston 40.

If the damper 26 includes an air damper 26, the strut assembly 20 may include an accumulator 42. The accumulator 42 is in fluid communication with the fluid cavity 32, and stores excess fluid, i.e., air, therein. Preferably, the accumulator 42 is in fluid communication with the fluid cavity 32 via an inline passage (not shown). However, the accumulator 42 may be mounted and connected to the strut assembly 20 in any suitable manner and at any desirable location on the strut assembly 20, and may be connected to the fluid cavity 32 in any suitable manner to provide fluid connection therebetween.

The damper 26 may include a variable rate damper 26 to adjust the dampening provided by the damper 26 to accommodate different oscillatory and/or load conditions. Alternatively, the damper 26 may include a constant rate damper 26 that maintains a constant rate of dampening regardless of the oscillatory and/or load condition.

If the damper 26 includes a variable rate damper 26, then the strut assembly 20 may include a control device, such as a solenoid 44, for adjusting the damper 26 to vary a damping force, i.e., for adjusting the amount of dampening provided by the damper 26. It should be appreciated that the variable rate damper 26 may be adjusted in other manners, and that the control device may include a device other than the solenoid 44.

A mounting plate 46 is coupled to the second rod end 38. The mounting plate 46 is configured for attachment to the vehicle. It should be appreciated that the mounting plate 46 may be configured differently for each specific type of vehicle and/or type of suspension, and as such is not described in detail herein. As shown, a spherical bearing 48 interconnects the rod 30 and the mounting plate 46. The spherical bearing 48 prevents bending of the rod 30 within a pre-determined range of movement in response to lateral loads being applied to the strut assembly 20. However, it should be appreciated that the rod 30 and the mounting plate 46 may be attached, connected or coupled in some other manner not shown or described herein. Throughout this specification, the term coupled or coupling shall be interpreted to mean that one element is in some manner connected or contacts another element, directly or indirectly through one or more intervening elements.

The housing 28 includes a first housing end 50 and a second housing end 52. The second housing end 52 is spaced from the first housing end 50 along the longitudinal axis 34. The second housing end 52 is disposed nearer the mounting plate 46 along the longitudinal axis 34 than the first housing end 50.

A bumper 54 is attached to the second housing end 52. The bumper 54 prevents relative compressive movement between the housing 28 and the mounting plate 46 beyond a stroke distance, the stroke distance being the maximum relative travel distance between the housing 28 and the rod 30. Preferably, the bumper 54 includes and is manufactured from a resilient material. The strut assembly 20 may include a cooper washer disposed between the bumper 54 and the damper 26 to augment the operation of the bumper 54.

A mounting bracket 56 is attached to the first housing end 50. The mounting bracket 56 is configured for attachment to the vehicle. It should be appreciated that the mounting bracket 56 may be configured differently for each specific type of vehicle and/or type of suspension, and as such is not described in detail herein.

The strut assembly 20 further includes a flexible membrane 58. The flexible membrane 58 includes a first membrane end 60 coupled to the housing 28 and a second membrane end 62 coupled to the mounting plate 46. The flexible membrane 58 is configured for receiving a pressurized gas. Once pressurized, the flexible membrane 58 operates to form an air spring. The air spring biases the mounting plate 46 away from the housing 28 along the longitudinal axis 34. Accordingly, the flexible membrane 58 cooperates with other components of the strut assembly 20, including but not limited to the housing 28 and the mounting plate 46, to define an air chamber 64. The air chamber 64 is sealed to the outside environment. As is well known in the art, the strut assembly 20 includes a fitting (not shown) in fluid communication with the air chamber 64. The fitting is coupled to an air supply of the vehicle to supply the air chamber 64 with the pressurized gas, i.e., pressurized air. The air spring shown in the drawings and described herein is commonly referred to as a rolling lobe air spring. However, it should be appreciated that other design types of air springs, such as a convoluted air spring, may alternatively be utilized.

A retaining ring, hereinafter referred to as a second retaining ring 66, couples the flexible membrane 58 to the mounting plate 46. The second retaining ring 66 may include a nut, a snap ring or some other device capable of fixedly securing the second end of the flexible membrane 58 to the mounting plate 46 and maintaining a fluid seal therebetween during operation.

The strut assembly 20 may include a sleeve 68. The sleeve 68 is attached to the mounting plate 46. The sleeve 68 extends along the longitudinal axis 34 toward the housing 28. The sleeve 68 is disposed about the flexible membrane 58. The sleeve 68 constrains radial flexure of the flexible membrane 58 in response to the longitudinal movement of the housing 28 relative to the mounting plate 46. Accordingly, as the strut assembly 20 compresses during normal use, the flexible membrane 58 tends to flex outward away from the longitudinal axis 34. The sleeve 68 is disposed about the flexible membrane 58 to limit the amount of radial flexure of the flexible membrane 58. As shown, the sleeve 68 includes a generally cylindrical shape. However, it should be appreciated that the sleeve 68 may include some other suitable shape and/or configuration not shown nor described herein. It should also be appreciated that the strut assembly 20 need not include the sleeve 68, and that the flexible membrane 58 may be configured to include a bellows like shape when expanded when the strut assembly 20 is in a compressed position.

The strut assembly 20 includes a coil spring 70. The coil spring 70 biases the mounting plate 46 away from the housing 28 along the longitudinal axis 34. The coil spring 70 may include a variable rate coil spring 70. Alternatively, the coil spring 70 may include a constant rate coil spring 70. The coil spring 70 includes a first spring end 72 in engagement with the housing 28 and a second spring end 74 in engagement with the mounting plate 46. The first spring end 72 is in engagement with the housing 28 between the first housing end 50 and the second housing end 52. In other words, the first spring end 72 is disposed along the longitudinal axis 34 near an approximate center of the housing 28, between the first housing end 50 and the second housing end 52. The strut assembly may include a pair of rubber grommets, with one disposed adjacent the first spring end 72 and the other disposed adjacent the second spring end 74. The rubber grommets reduce undesirable noise and vibration of the coil spring 70.

The coil spring 70 defines an inner diameter 76, and is disposed about an outer periphery 78 of the housing 28. Having the coil spring 70 disposed about the outer periphery 78 of the housing 28 permits axial movement of the housing 28 within the inner diameter 76 of the coil spring 70 relative to the coil spring 70. Accordingly, during compression and expansion of the strut assembly 20, the coil spring 70 may compress at a different rate along the longitudinal axis 34 relative to the mounting plate 46 than the housing 28 moves along the longitudinal axis 34 relative to the mounting plate 46. Accordingly, because the coil spring 70 is disposed about the outer periphery 78 of the housing 28, the strut assembly 20 of the subject invention permits a heavier coil spring 70 to be utilized therewith than prior air spring strut assemblies 20. As such, the coil spring 70 of the subject invention may be sized to and capable of accommodating the full load of the vehicle, by itself, in the event the air spring and the damper 26 simultaneously fail.

The first spring end 72 is disposed outside of the first membrane end 60 and the second membrane end 62 along the longitudinal axis 34. As such, at least a portion of the coil spring 70 is disposed along the longitudinal axis 34 outside of the flexible membrane 58. In other words, the coil spring 70 extends along the longitudinal axis 34, from the mounting plate 46 towards and past the second housing end 52 about the outer periphery 78 of the housing 28, and towards and past the first membrane end 60 of the flexible membrane 58.

A spring container 80 is attached to the housing 28. The spring container 80 cooperates with the housing 28 to define a spring chamber 82 between the spring container 80 and the housing 28. The first spring end 72 is supported by and disposed within the spring chamber 82 by the spring container 80. The spring chamber 82 is in fluid communication with and defines a portion of the air chamber 64 of the air spring.

The spring container 80 includes a radial flange 84. The radial flange 84 is attached to the housing 28 between the first housing end 50 and the second housing end 52. The radial flange 84 extends radially outward from the housing 28 relative to the longitudinal axis 34. The first spring end 72 of the coil spring 70 abuts and is axially supported by the radial flange 84. As shown, the radial flange 84 and the first spring end 72 are disposed nearer the first housing end 50 than the second housing end 52. However, it should be appreciated that the radial flange 84 and the first spring end 72 may be disposed nearer the second housing end 52 than the first housing end 50.

The spring container 80 includes a wall 86. The wall 86 is attached to the radial flange 84, and is disposed about an outer periphery 78 of the coil spring 70. The wall 86 extends a wall 86 length along the longitudinal axis 34 toward the second housing end 52. Preferably, the wall 86 includes a cylindrical cross sectional shape perpendicular to the longitudinal axis 34. However, it should be appreciated that the wall 86 may include some other cross sectional shape other than cylindrical.

The wall 86 includes a first wall end 88 and a second wall end 90. The first wall end 88 is attached to the radial flange 84, and is in fluid sealing engagement with the radial flange 84. The second wall end 90 is spaced from the first wall end 88 along the longitudinal axis 34. The first membrane end 60 is attached to the second wall end 90 in fluid sealing engagement. A retaining ring, hereinafter referred to as a first retaining ring, couples the flexible membrane 58 to the wall 86. The first retaining ring may include a nut, a snap ring or some other device capable of fixedly securing the second end of the flexible membrane 58 to the mounting plate 46 and maintaining a fluid seal therebetween during operation.

An air spring piston 94 is attached to the wall 86 adjacent the second wall end 90. The air spring piston 94 moves with the wall 86 and the housing 28 during longitudinal movement of the housing 28 relative to the rod 30. The air spring piston 94 guides the flexible membrane 58 outward away from the rod 30 and the coil spring 70 as the wall 86 moves with the housing 28 toward the mounting plate 46 along the longitudinal axis 34. As shown, the air spring piston 94 includes a frustoconical shape. The frustoconical shape of the air spring piston 94 shown provides a maximum lift force when the strut assembly 20 is in the compressed position, and provides a maximum spring rate when the strut assembly 20 is in the extended position. Additionally, the frustoconical shape of the air spring piston provides a progressive transition between the maximum lift force when in the compressed position and the maximum spring rate when in the extended position. However, it should be appreciated that the air spring piston 94 may include some other shape not shown or described herein, such as a cylindrical shape.

Figure 5:
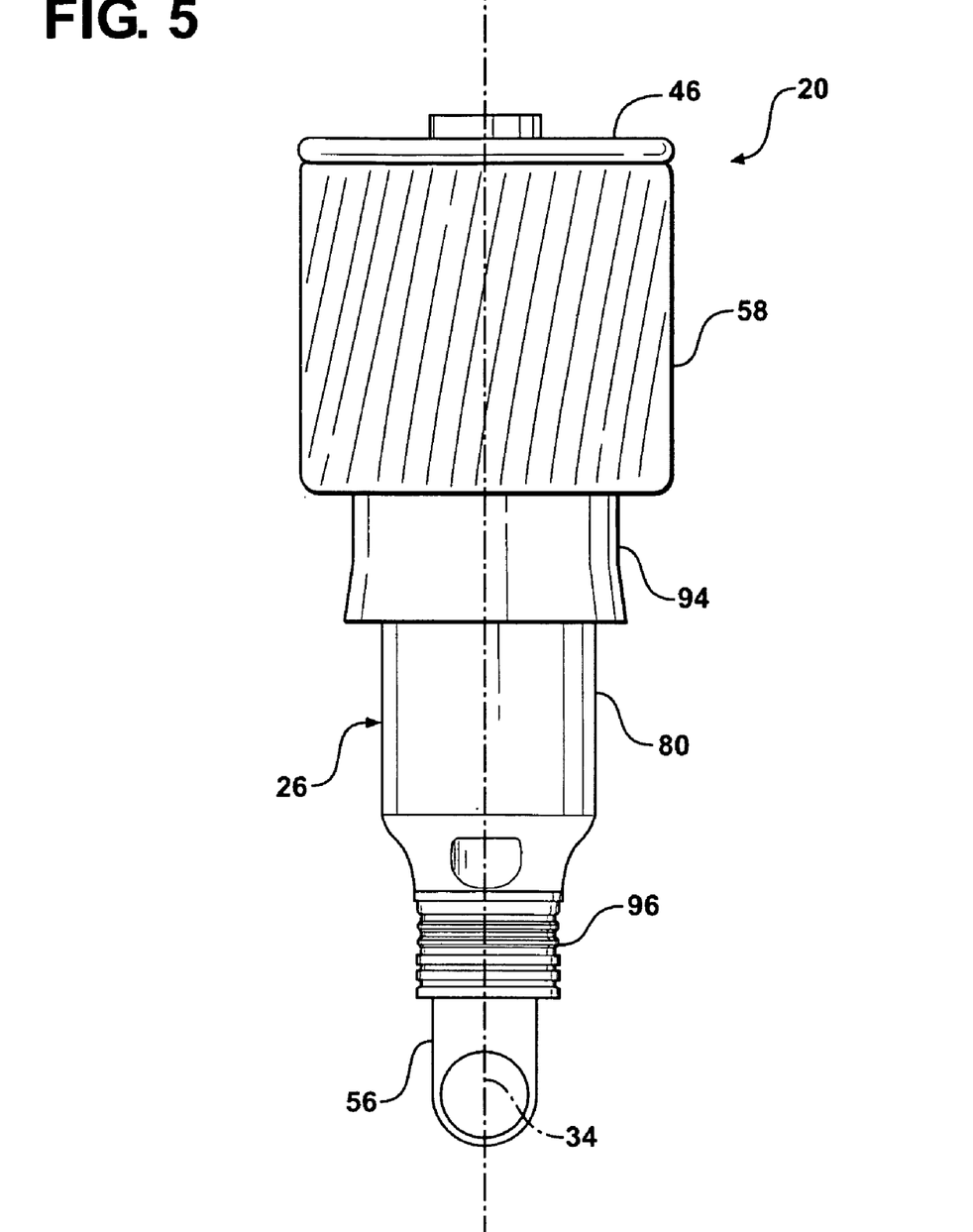
FIG. 5 is a side plan view of an alternative embodiment of the strut assembly.

Referring to FIG. 5, an alternative embodiment of the strut assembly 20 is shown. The alternative embodiment of the strut assembly 20 includes a heat exchanger 96 incorporated into a lower end of the spring container 80. The heat exchanger 96 absorbs heat from the damper 26 and dissipates the heat into the ambient air to remove the heat from the damper 26. The heat exchanger includes a plurality of fins extending radially outward from the spring container 80.

The strut assembly 20 may further include a height sensor. The height sensor may be incorporated internally of the strut assembly 20, such as within the air chamber 64, or alternatively may be disposed externally of the strut assembly 20. The height sensor measures an overall length of the strut assembly 20. The air pressure within the air spring may be adjusted, according to the measured height of the strut assembly 20, to compensate for a payload of the vehicle, to thereby raise or lower the strut assembly to ensure an adequate ground clearance under all loading conditions.

The strut assembly 20 may further include a recoil mechanism. The recoil mechanism prevents movement of the strut assembly 20 beyond a pre-determined length to ensure that any propulsion or suspension components of the vehicle, such as a CV or universal joint, are not overextended or over articulated. The recoil mechanism may include a cable or a chain, having one end connected to the strut assembly 20 and another end connected to the vehicle to prevent overextension of the strut assembly 20. It should be appreciated that the recoil mechanism may include some other configuration not shown or described herein.

The invention has been described in an illustrative manner, and it is to be understood that the terminology which has been used is intended to be in the nature of words of description rather than of limitation. As is now apparent to those skilled in

What is claimed is:

1. A strut assembly for a vehicle, said strut assembly comprising:
a damper including a housing defining a fluid cavity and extending along a longitudinal axis and further including a rod moveable relative to said housing along said longitudinal axis and having a first rod end disposed within said cavity and a second rod end spaced from said housing along said longitudinal axis;
a mounting plate coupled to said second rod end and configured for attachment to the vehicle;
a flexible membrane having a first membrane end coupled to said housing and a second membrane end coupled to said mounting plate and configured for receiving a pressurized gas to form an air spring to bias said mounting plate away from said housing along said longitudinal axis;
a coil spring having a first spring end in engagement with said housing and a second spring end in engagement with said mounting plate for biasing said mounting plate away from said housing along said longitudinal axis;
said coil spring defining an inner diameter and disposed about an outer periphery of said housing to permit axial movement of said housing within said inner diameter of said coil spring along said longitudinal axis;
wherein said first spring end is disposed outside of said flexible membrane.

2. An assembly as set forth in claim 1 wherein said housing includes a first housing end and a second housing end spaced from said first housing end along said longitudinal axis with said first spring end in engagement with said housing between said first housing end and said second housing end.

3. An assembly as set forth in claim 2 further comprising a spring container attached to said housing and cooperating with said housing to define a spring chamber between said spring container and said housing with said first spring end supported by and disposed within said spring chamber by said spring container.

4. An assembly as set forth in claim 3 wherein said spring container includes a radial flange attached to said housing between said first housing end and said second housing end and extending radially outward relative to said longitudinal axis with said first spring end abutting said radial flange.

5. An assembly as set forth in claim 4 wherein said spring container includes a wall attached to said radial flange and disposed about an outer periphery of said coil spring and extending a wall length along said longitudinal axis toward said second housing end.

6. An assembly as set forth in claim 5 wherein said wall includes a first wall end attached to said radial flange in sealing engagement and a second wall end spaced from said first wall end along said longitudinal axis with said first membrane end attached to said second wall end in sealing engagement.

7. An assembly as set forth in claim 6 further comprising an air spring piston attached to said wall adjacent said second wall end for guiding said flexible membrane as said wall moves with said housing toward said mounting plate along said longitudinal axis.

8. An assembly as set forth in claim 7 wherein said air spring piston includes a frustoconical shape.

9. An assembly as set forth in claim 4 wherein said second housing end is disposed nearer said mounting plate along said longitudinal axis than said first housing end and wherein said radial flange and said first spring end are disposed nearer said first housing end than said second housing end.

10. An assembly as set forth in claim 9 further comprising a bumper attached to said second housing end for preventing relative compressive movement between said housing and said mounting plate beyond said stroke distance.

11. An assembly as set forth in claim 9 further comprising a mounting bracket attached to said first housing end and configured for attachment to the vehicle.

12. An assembly as set forth in claim 3 wherein said spring container includes a heat exchanger for absorbing heat from said damper and dissipating the heat into ambient air.

13. An assembly as set forth in claim 1 wherein said damper includes an air damper.

14. An assembly as set forth in claim 13 further comprising an accumulator in fluid communication with said cavity for storing excess fluid.

15. An assembly as set forth in claim 1 further comprising a sleeve attached to said mounting plate and extending along said longitudinal axis toward said housing and disposed about said flexible membrane for constraining radial flexure of said flexible membrane in response to said longitudinal movement of said housing relative to said mounting plate.

16. An assembly as set forth in claim 1 further comprising a retaining ring coupling said flexible membrane to said mounting plate.

17. An assembly as set forth in claim 1 further comprising a damper piston attached to said first rod end and moveable relative to said housing during said longitudinal movement of said housing relative to said mounting plate.

18. An assembly as set forth in claim 1 wherein said damper includes a hydraulic damper.

19. An assembly as set forth in claim 1 further comprising a spherical bearing interconnecting said rod and said mounting plate.

20. An assembly as set forth in claim 1 wherein said coil spring includes a variable rate coil spring.

21. An assembly as set forth in claim 1 wherein said damper includes a variable rate damper.

22. An assembly as set forth in claim 21 further comprising a solenoid for adjusting the damper to vary a damping force.

23. An assembly as set forth in claim 1 wherein said damper includes a constant rate damper.

24. An assembly as set forth in claim 1 wherein said coil spring includes a constant rate coil spring.

25. A strut assembly for a vehicle, said strut assembly comprising:
a damper including a housing defining a fluid cavity and extending along a longitudinal axis and further including a rod moveable relative to said housing along said longitudinal axis and having a first rod end disposed within said cavity and a second rod end spaced from said housing along said longitudinal axis;
a mounting plate coupled to said second rod end and configured for attachment to the vehicle;
a flexible membrane having a first membrane end coupled to said housing and a second membrane end coupled to said mounting plate and configured for receiving a pressurized gas to form an air spring to bias said mounting plate away from said housing along said longitudinal axis;

a coil spring having a first spring end in engagement with said housing and a second spring end in engagement with said mounting plate for biasing said mounting plate away from said housing along said longitudinal axis;

said coil spring defining an inner diameter and disposed about an outer periphery of said housing to permit axial movement of said housing within said inner diameter of said coil spring along said longitudinal axis;

wherein said housing includes a first housing end and a second housing end spaced from said first housing end along said longitudinal axis with said first spring end in engagement with said housing between said first housing end and said second housing end; and a spring container is attached to said housing and cooperates with said housing to define a spring chamber between said spring container and said housing with said first spring end disposed within said spring chamber and supported by said spring container.

26. An assembly as set forth in claim 25 wherein said spring container includes a radial flange attached to said housing between said first housing end and said second housing end and extending radially outward relative to said longitudinal axis with said first spring end abutting said radial flange.

27. An assembly as set forth in claim 26 wherein said spring container includes a wall attached to said radial flange and disposed about an outer periphery of said coil spring and extending a wall length along said longitudinal axis toward said second housing end.

28. An assembly as set forth in claim 27 wherein said wall includes a first wall end attached to said radial flange in sealing engagement and a second wall end spaced from said first wall end along said longitudinal axis with said first membrane end attached to said second wall end in sealing engagement.

29. An assembly as set forth in claim 28 further comprising an air spring piston attached to said wall adjacent said second wall end for guiding said flexible membrane as said wall moves with said housing toward said mounting plate along said longitudinal axis.

30. An assembly as set forth in claim 29 wherein said air spring piston includes a frustoconical shape.

31. An assembly as set forth in claim 26 wherein said second housing end is disposed nearer said mounting plate along said longitudinal axis than said first housing end and wherein said radial flange and said first spring end are disposed nearer said first housing end than said second housing end.

32. An assembly as set forth in claim 31 further comprising a bumper attached to said second housing end for preventing relative compressive movement between said housing and said mounting plate beyond said stroke distance.

33. An assembly as set forth in claim 31 further comprising a mounting bracket attached to said first housing end and configured for attachment to the vehicle.

34. An assembly as set forth in claim 25 wherein said spring container includes a heat exchanger for absorbing heat from said damper and dissipating the heat into ambient air.

* * * * *